Aug. 31, 1954     H. C. WARD ET AL     2,687,884

FILM ADVANCING AND FILTERING MECHANISM

Filed Oct. 18, 1951     3 Sheets-Sheet 1

INVENTORS.
Hugh C. Ward &
James L. Pettus
BY

ATTORNEY.

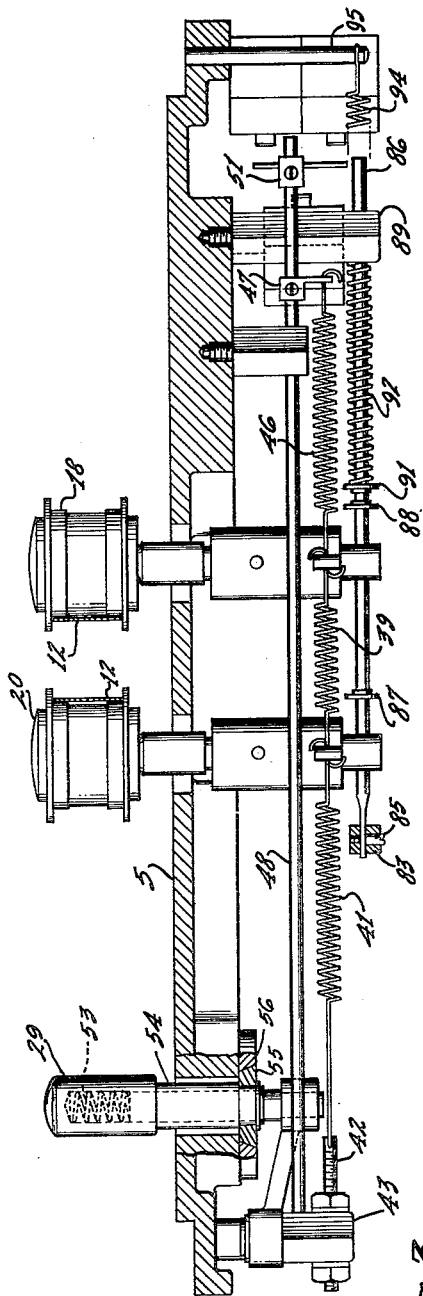
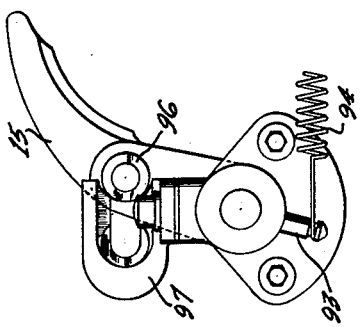
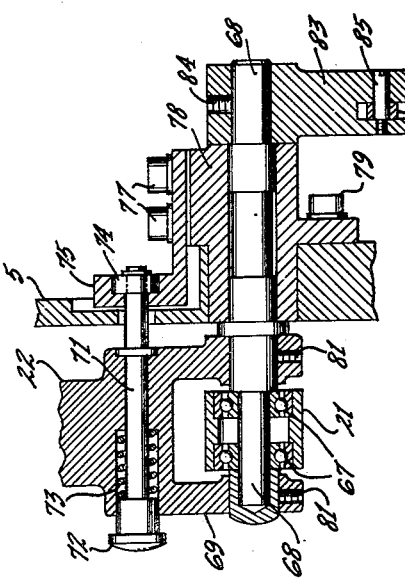
Fig. 3.
Fig. 5.
Fig. 4.
INVENTORS.
Hugh C. Ward &
James L. Pettus
BY
ATTORNEY.

Patented Aug. 31, 1954

2,687,884

UNITED STATES PATENT OFFICE 2,687,884

FILM ADVANCING AND FILTERING MECHANISM

Hugh C. Ward, Los Angeles, and James L. Pettus, Encino, Calif., assignors to Radio Corporation of America, a corporation of Delaware Application October 18, 1951, Serial No. 251,877

7 Claims. (Cl. 271—2.3)

This invention relates to sound recording and reproducing equipment, and particularly to a compact magnetic film drive and control mechanism providing uniform film motion past recording and reproducing heads.

The general principle involved in the present invention is disclosed and claimed in co-pending Pettus and Albee U. S. application, Ser. No. 251,384, filed October 15, 1951, wherein a symmetrical form of film path for a magnetic recorder and reproducer is shown. This prior application also discloses a mechanical filter for the film path which is automatically adjusted for maximum filtering action when the film is advanced in either direction. Another feature disclosed in this co-pending application and incorporated in the present invention is a control gauge for threading the correct amount of film in the tensioned film path. The present invention provides these general features, but in a more compact and simplified form suitable for use in portable recording and reproducing units.

As mentioned in detail hereinafter, the film path of the present invention is symmetrical, utilizes two sprockets instead of a single sprocket, utilizes two inertia drums, utilizes two tensioning rollers, one in each film loop between each sprocket and a respective drum, utilizes a triple spring tensioning action, which is automatically adjusted in accordance with the direction of film travel, and which automatically adjusts the tensioning rollers to fixed positions to provide a threading gauge. An important feature of the present invention is the unitary assembly of the film drive and tensioning elements, whereby they occupy the minimum of space with maximum uniformity of speed advancement to permit the entire recorder and reproducer to be a portable unit.

The principal object of the invention, therefore, is to facilitate the recording and reproducing of sound, particularly on and from magnetic mediums.

Another object of the invention is to provide an improved magnetic tape or film sound recorder or reproducer.

A further object of the invention is to provide an improved magnetic film drive which occupies a small space and provides stable film motion at the recording and reproducing points when the film is driven in either direction.

A still further object of the invention is to provide a mechanically controlled film length gauge for threading the recorder and reproducer.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 3 is a plan view showing the filter drive elements taken along the line 3—3 of Fig. 2.

Fig. 4 is a cross-sectional view of the guide roller and guide shoe taken along the line 4—4 of Fig. 2, and Fig. 5 is a detailed view of the guide roller and guide shoe used in the invention.

Figure 1:
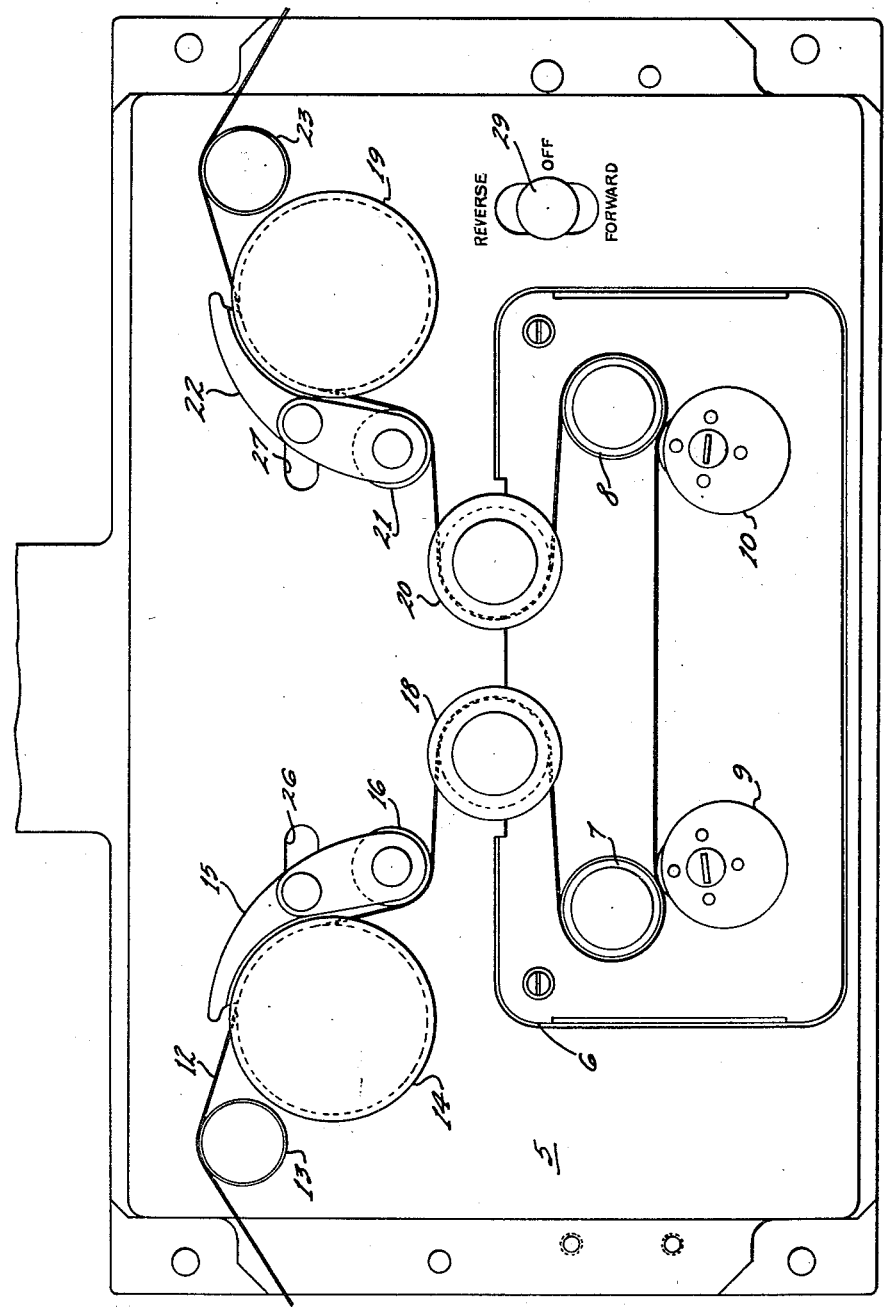
Fig. 1 is a front, elevational view of the film driving mechanism at the recording and reproducing points.

Referring now to the drawings, in which the same numerals identify like elements, a panel 5 has mounted thereon a shield box 6 in which is a pair of inertia drums 7 and 8 having flywheels on the shaft thereof, and a pair of magnetic heads 9 and 10, which may be single or multiple, as disclosed in Pettus co-pending U. S. application, Ser. No. 230,403, filed June 7, 1951, now U. S. Patent No. 2,644,856.

The film 12 passes over a guide roller 13, over a sprocket 14, under an adjustable shoe 15, and under a guide roller 16. The film then passes around a tensioning roller 18, the inertia drum 7, past magnetic head 9, past magnetic head 10, around inertia roller 8, to the second tensioning roller 20. The heads 9 and 10 may serve as either recording or reproducing heads, depending upon the direction of film travel. The film then passes under the guide roller 21, under an adjustable shoe 22, over sprocket 19, and over a guide roller 23. The guide rollers 13 and 16 for sprocket 14 and rollers 21 and 23 for sprocket 19 provide for less than a ninety degree wrap of the film over the respective sprockets. This has been found to aid the filtering action to obtain constant film motion at the recording and reproducing heads. The shoes 15 and 22 are movable around the axes of the rollers 16 and 21, respectively, along the elongated slots 26 and 27, as will be explained hereinafter. Also shown in Fig. 1, is the end of a switch lever 29 in neutral or off position. The lower position of the lever advances the film in one direction, and the upper position advances the film in the reverse direction.

Figure 2:
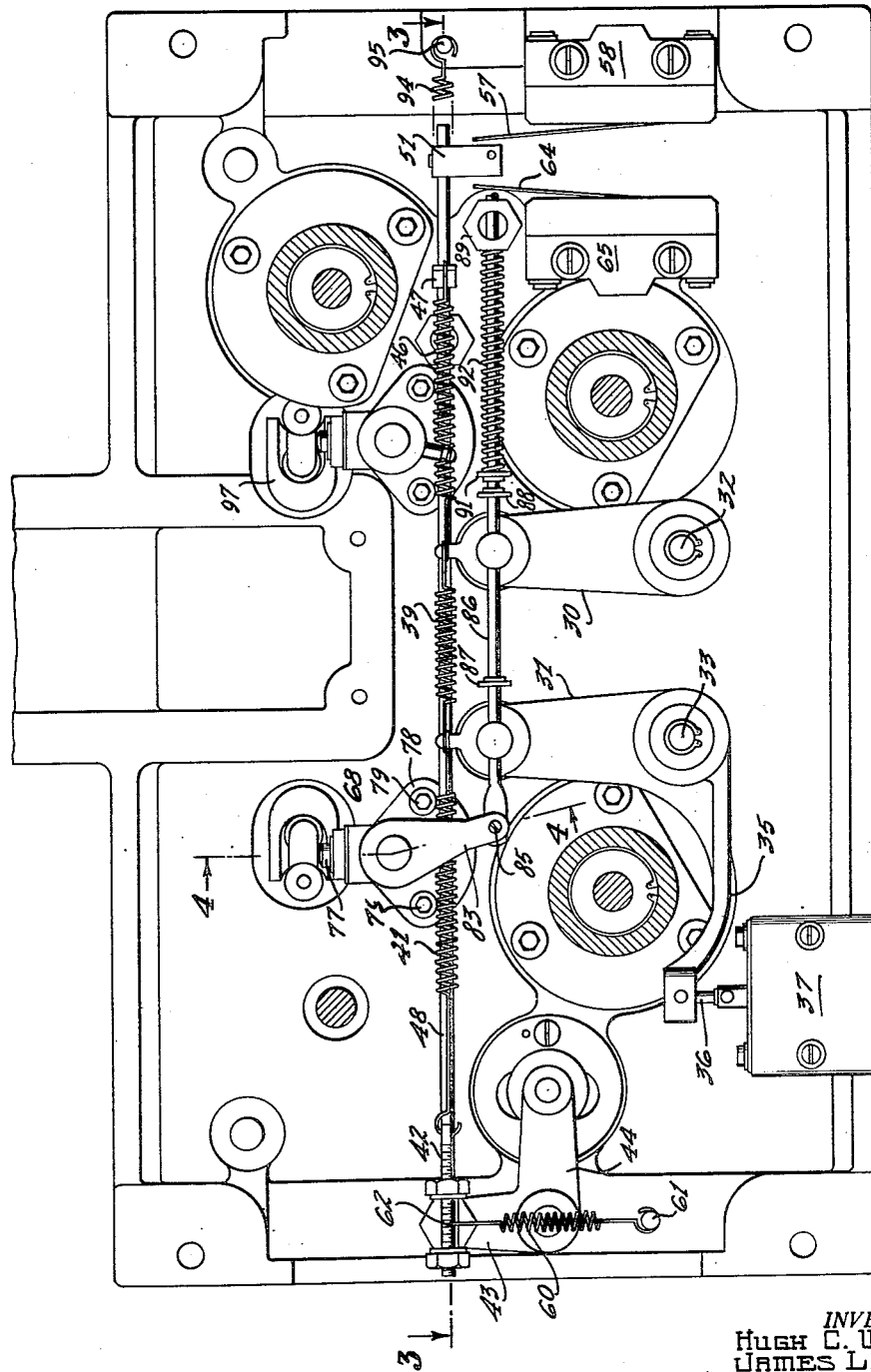
Fig. 2 is a rear view showing the mechanical film drive filtering elements.

Referring now to Figs. 2 to 5, inclusive, and particularly to Figs. 2 and 3, the tensioned rollers 18 and 20 are mounted on the upper ends of respective arms 30 and 31, pivoted on axes 32 and 33, respectively. Arm 31 is a bell crank having a leg 35 attached to the end of a piston rod 36 of a dashpot 37. Thus, roller 20 is under dashpot control. Connected between the upper extensions of arms 30 and 31, is a tensioning spring 39, which urges the arms 30 and 31 toward one another, and consequently, the rollers 18 and 20 toward one another to tension the films in the respective loops. A second spring 41 has one end connected to the extension of arm 31, and its other end connected to an adjustable bolt 42 passing through the end of an arm 43 of a bell crank 44 of the switch mechanism. A third spring 46 has one end attached to the extension of arm 30 and its other end to a lug 47 attached to a rod 48, which is also attached to the end of arm 43 and movable therewith. The other end of the rod 48 has a switch actuating arm 51 mounted thereon.

In normal operation, the spring 39 exerts approximately three times the force of either of springs 41 or 46, the springs 41 and 46, however, having different tensions therein, depending upon the direction of advancement of the film 12. This varying tension is accomplished upon actuation of the switch handle 29, the handle being shown in normal position in Figs. 1, 2, and 3. When the handle 29 is pressed axially, it compresses an internal spring 53 and moves a shaft 54 longitudinally to remove the trapezoidally shaped collar 55 from a recess in the plate 56. Assuming that the switch has been moved downwardly, the arm 43 is then positioned to the right in Fig. 2, and the rod 48 is in its right-hand position. Since the right-hand end of spring 46 has now moved to the right, and the left-hand end of spring 41 to the right, the tension is increased in spring 46 and decreased in spring 41. Simultaneously, the switch contactor 51 contacts the lever 57 to close a contact in switch 59, which energizes the driving motor and advances the film from left to right in Fig. 1. In this instance, spring 46 is stronger than spring 41. The switch is held in its adjusted position by the friction of the washer 55 against the surface of plate 56 and the eccentric action of a spring 60 fixedly anchored at 61 and anchored at 62 to the arm 43. Thus, the spring 60 acts in a toggle fashion to hold the switch arm in either of its adjusted positions.

Assuming the switch 29 has been thrown to its upper position to reverse the direction of travel of the film, the rod 48 is now in its left-hand position, increasing the tension in spring 41, and decreasing the tension in spring 46 to provide the optimum filtering tension for the new direction of film travel. The stronger end spring is always on the roller in the loop from the feeding sprocket to counteract the tension in the film loop to the pulling sprocket. Simultaneously, the arm 51 contacts the lever 64 of switch 65 to reverse the energization of the driving motor. Thus, the electrical switching is done remotely, while the filtering action is adjusted mechanically to the two positions, depending upon the direction of film travel.

Referring now to Figs. 4 and 5, Fig. 4 showing the general construction of both guide roller and shoe assemblies, the guide roller 21 is mounted on ball bearings 67 on a shaft 68. On either side of the roller 21 are the ends of a yoke 69, which terminates in the curved shoe 22. Inserted in an opening in the yoke 69, is a rod 71 having a finger knob 72. The rod 71 is biased by a spring 73 to hold a collar 74 in a recess in the L-shaped bracket member 75 attached by screws 77 to a bracket 78 attached to the panel 5 by screws 79.

The yoke 69 is held on shaft 68 by set screws 81 and movement of the shoe 22, when released by rod 71, rotates an arm 83 attached to the other end of shaft 68 by set screw 84. On a pin 85 in the end of arm 83 is the end of a rod 86, on which are two fixed washers 87 and 88. (See Figs. 2 and 3.) The other end of rod 86 is slidable in a hole in an hexagonal member 89, and, positioned between said member 89 and a fixed washer 91, is a spring 92. The rod 86 passes through oversized holes adjacent the ends of the shafts of rollers 18 and 20. The spring 92 is under compression, urging the washer 91 away from member 89 so that when the rod 71 is released by longitudinal movement to the right, as shown in Fig. 4, the spring 92 will raise the shoe 22 from the sprocket 19, the collar 74 reseating itself in another recess in the bracket 75. Movement of the rod 86 moves the washers 87 and 88 into contact with the arms 30 and 31 to move the rollers 20 and 18 to their extreme right-hand positions, as shown in Fig. 1. This position is determined when the shafts of the rollers 18 and 20 contact the sides of the shaft openings in the panel 5. A gauge is thus provided for threading the film 12 between the sprockets 14 and 19 simply by tightening the film in the loop between the sprockets, and then closing the shoes 15 and 22. This general feature is described in the above mentioned co-pending U. S. application, Ser. No. 251,384.

The other shoe 15, shown in Fig. 5, is of the same construction as that just described, but instead of having the lever arm 83 on the shaft thereof, an extension 93 is provided, to which is attached one end of a spring 94, the other end of the spring being attached to an anchor member 95. Thus, when its control rod, such as 71, is pushed, the collar 96 is removed from a recess in a plate 97 and the spring 94 will remove the shoe 15 from the sprocket 14. When it is desired to close the shoe, the control rod is again pushed, and the shoe is manually moved into closed position against the tension of spring 94.

The film drive as described above, therefore, uses two sprockets to form a symmetrical film path therebetween, and utilizes the general film filtering principles as disclosed and claimed in Pettus and Albee co-pending U. S. application, Ser. No. 251,384, mentioned above, and in Pettus co-pending U. S. application, Ser. No. 201,658, filed December 19, 1950. In the present invention, however, the drive and the tensioning and threading controls are compressed into the minimum of space on a single panel, while still obtaining maximum filtering action.

We claim:

1. A film drive system comprising a pair of film drive sprockets, a film shoe for each of said sprockets, means for maintaining each of said shoes in closed position on its respective sprocket, a pair of inertia drums, a pair of tensioning rollers, the film passing from one sprocket around one tensioning roller, around one drum, and then around the other drum, the other tensioning roller, and over the other sprocket, resilient means for urging said tensioning rollers toward one another, a pair of resilient means for urging said tensioning rollers away from one another, a switch mechanism having a portion movable substantially parallel with the axis of said resilient means for varying the tension of said pair of resilient means with respect to each other depending upon the direction of advancement of the film through said mechanism, spring means connected to one of said film shoes for urging said shoe toward open position, and means associated with said spring means for holding said tensioning rollers in fixed positions when said shoe is moved to open position by said spring means.

2. A film drive system comprising a pair of film drive sprockets, a pair of inertia drums, a pair of tensioning rollers, the film passing from one sprocket around one tensioning roller, around one drum, and then around the other drum, the other tensioning roller, and over the other sprocket, resilient means for urging said tensioning rollers toward one another, a pair of resilient means for urging said tensioning rollers away from one another, a switch mechanism having a portion movable substantially parallel with the axis of said resilient means for varying the tension of said pair of resilient means with respect to each other depending upon the direction of advancement of the film through said mechanism, a film shoe for each of said sprockets, a shaft for each of said film shoes, a respective shaft of each film shoe being rotatable with movement of its respective shoe, individual means attached to each of said shafts for movement therewith, resilient means connected to each of said last mentioned means for moving its respective shoe to open position upon release of a respective film shoe, and means for retaining said shoes in closed positions, one of said individual means attached to one of said shafts including means for moving said tensioning rollers to predetermined positions.

3. A film drive and filter system comprising a panel, a film sprocket mounted in one corner of said panel, a second film sprocket mounted in the other corner of said panel, a pair of inertia drums, each of which is spaced at substantially the same distance from one of said sprockets, a pair of tensioning rollers intermediate said sprockets and said inertia drums, said film passing over one of said sprockets, around one of said tensioning rollers, around one of said drums, and then around the other of said drums, the other of said tensioning rollers, and over the other of said sprockets, guide rollers for guiding film to and from each of said sprockets, the position of said guide rollers providing less than ninety degrees of contact between said film and said sprockets, a film shoe for each of said sprockets, arms for pivotally mounting each of said tensioning rollers, resilient means interconnecting said arms and one of said shoes for holding said arms in fixed positions when said shoe is in open position, a spring for urging said arms toward one another, springs having one end of each attached to said arms for urging said arms away from one another, and means for varying the tension in said last mentioned springs in accordance with the direction of rotation of said sprockets.

4. A film drive and filter system in accordance with claim 3, in which said last mentioned means includes a crank arm switch mechanism together with a rod attached to said mechanism and to which the other ends of said last mentioned springs not attached to said arms are attached, movement of said crank arm mechanism varying the tension on said last mentioned springs in reverse order.

5. A film drive and control therefor comprising a panel, film advancing means on one side of said panel, means for driving said film advancing means and for filtering said film motion on the other side of said panel, said film advancing means including a pair of sprockets in the corners of said panel, said sprockets being driven by said driving means, said filtering means including a pair of film pulled inertia drums adjacent the other corners of said panel, a pair of tensioning rollers intermediate said sprockets and drums, said film passing from one sprocket, around one roller, around one drum, around the other drum, the other roller, and to the other sprocket, film shoe units for each sprocket, means for retaining said units in closed positions, a tensioned rod, said rod being attached to one of said film shoe units, said tensioned rod moving said shoe from its sprocket and having means thereon for holding said rollers in fixed predetermined positions.

6. A film tensioning and loop gauging system, comprising a pair of sprockets, a guide roller and shoe for each of said sprockets, said shoes being pivoted on the axes of said rollers, means for retaining said shoes in their respective closed positions, a pair of tensioning rollers, a pair of inertia drums, film passing between one of said sprockets and its respective roller and shoe unit, around one of said tensioning rollers, around said inertia drums, around the other tensioning roller, and between said other sprocket and its respective roller and shoe unit, a pivoted arm for each of said tensioning rollers, a rod movable substantially at right angles to said arms, means on said rod for contacting said arms, means connecting one of said shoes and said rod, and tensioning means on said rod for removing said one shoe from its respective sprocket and moving said tensioning rollers to fixed predetermined positions.

7. A film tensioning and loop gauging system in accordance with claim 6, in which an extension from said other shoe is provided, together with a spring connected to said extension, and means for releasing said shoe to permit said spring to remove said shoe from said sprocket.

References Cited in the file of this patent

UNITED STATES PATENTS

| Number | Name | Date |
|---|---|---|
| 1,831,562 | Heisler | Nov. 10, 1931 |
| 1,909,074 | Reynolds | May 16, 1933 |
| 2,091,692 | Scott | Aug. 31, 1937 |
| 2,108,337 | Hoffman | Feb. 15, 1938 |
| 2,209,582 | Ross | July 30, 1940 |
| 2,349,018 | Tasker | May 16, 1944 |
| 2,418,544 | Collins | Apr. 8, 1947 |
| 2,418,545 | Zimmerman | Apr. 8, 1947 |

FOREIGN PATENTS

| Number | Country | Date |
|---|---|---|
| 370,001 | Great Britain | Mar. 24, 1932 |
| 477,943 | Great Britain | Jan. 10, 1938 |
| 506,654 | Great Britain | June 1, 1939 |